United States Patent
Hill et al.

(10) Patent No.: US 6,744,230 B2
(45) Date of Patent: Jun. 1, 2004

(54) METHOD AND APPARATUS FOR FINE RESOLUTION BRUSHLESS MOTOR CONTROL

(75) Inventors: Bryan H. Hill, Phoenix, AZ (US); Dean R. Wilkins, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/283,472

(22) Filed: Oct. 29, 2002

(65) Prior Publication Data

US 2004/0080290 A1 Apr. 29, 2004

(51) Int. Cl.[7] .................. H02K 23/00; G05B 19/31; H03M 1/48
(52) U.S. Cl. ............... 318/254; 318/439; 318/138; 318/701; 318/738; 318/605; 341/116
(58) Field of Search .................. 318/254, 439, 318/438, 701, 721, 738, 463, 464, 244, 733, 43, 609, 610, 605; 341/111–117

(56) References Cited

U.S. PATENT DOCUMENTS

| 3,696,277 A | * | 10/1972 | Liska et al. ............... 318/138 |
| 3,775,649 A | * | 11/1973 | Bayer et al. ............... 318/702 |
| 3,796,935 A | * | 3/1974 | Blaschke ................... 318/801 |
| 5,155,696 A | * | 10/1992 | Shibata et al. ............. 700/302 |
| 5,241,268 A | * | 8/1993 | Lee ......................... 324/207.25 |
| 5,646,496 A | * | 7/1997 | Woodland et al. ......... 318/632 |
| 5,912,638 A | * | 6/1999 | Vlahu ....................... 341/116 |
| 6,084,376 A | * | 7/2000 | Piedl et al. ................ 318/605 |

FOREIGN PATENT DOCUMENTS

JP 04021390 A * 1/1992 ............. H02P/6/02

* cited by examiner

Primary Examiner—Robert Nappi
Assistant Examiner—Edgardo San Martin

(57) ABSTRACT

A motor controller (30) includes three analog Hall-effect sensors (42, 44, 46) for forming continuous-time signals proportional to the sine and cosine of the position of the rotor (24) of a motor (20). The sine and cosine signals are differentiated to obtain signals proportional to the rotor rate times the sine and cosine values. These integrated values are then multiplied by the cosine and inverse of the sine values, respectively, to obtain values equal to the rotor rate times the square of the cosine and the rotor rate times the square of the sine. These latter two values are summed to obtain an output signal proportional to the rotor rate based on the trigonometric identity $\sin^2(x)+\cos^2(x)=1$. Since the motor controller (30) derives a high-resolution value for the rotor rate, it may be used for fine resolution control of brushless motors and the like.

15 Claims, 3 Drawing Sheets

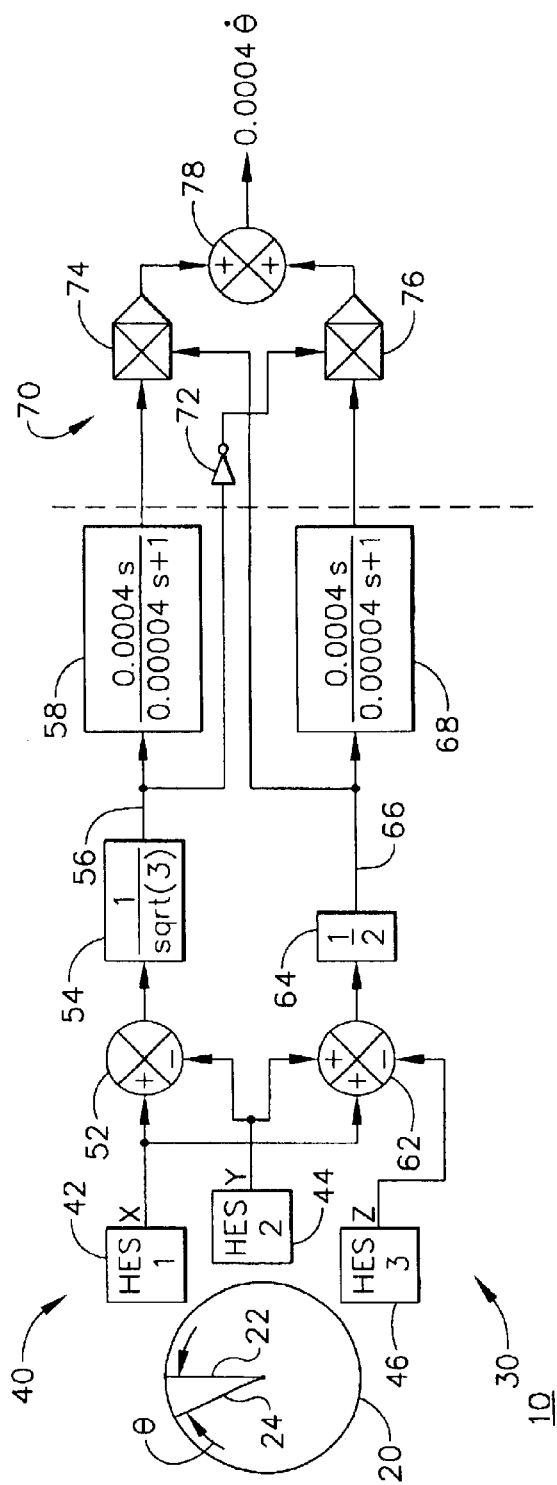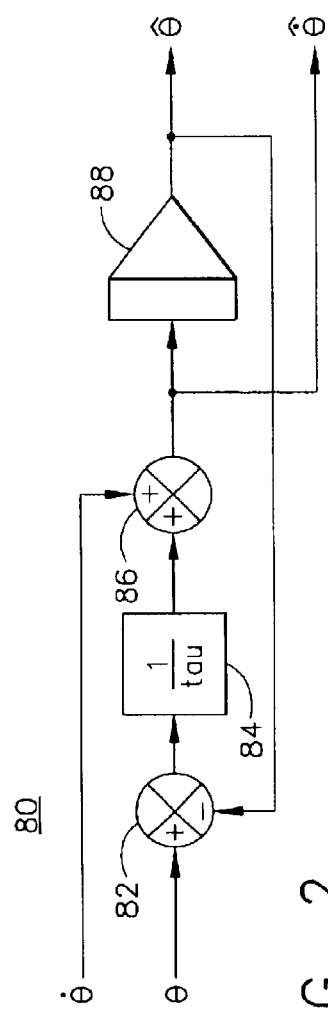
FIG. 1
FIG. 2

METHOD AND APPARATUS FOR FINE RESOLUTION BRUSHLESS MOTOR CONTROL

FIELD OF THE INVENTION

This invention relates generally to electric motors, and more particularly to methods and apparatus for fine resolution control of electric motors.

BACKGROUND OF THE INVENTION

Electric motors are used in many different types of applications. Some of these applications allow low precision motor control and in these applications low-cost motors and motor controllers may be used. For example one well-known technique applicable to systems that require a constant motor speed performs rate control using low-cost digital Hall-effect sensors. The outputs of these sensors are used to determine motor position and velocity. When the rotor of the motor rotates to a certain position the digital Hall effect sensors change state and trigger the commutation logic to switch the drivers into the next state. The switching can also be used for rate control.

Other applications such as autopilot servo systems require much more precise control. The problem is compounded by the fact that these systems often use brushless motors to decrease the inertia in the rotor for quick speed adjustment. However because of their lower inertia brushless motors are subject to a jerky motion that may be caused by the control loop. This jerky motion can be felt by passengers and is highly undesirable.

There are several known techniques for improving the precision of the motor control loops. The whole control loop may be made as a servo system, but such a system is large and expensive. Additional sensors may be used, such as optical sensors, additional Hall-effect sensors, or tachometers. These additional sensors make the systems more expensive.

Another technique uses analog Hall-effect sensors. According to this technique the analog Hall-effect sensors are used to form the sine and cosine functions of the rotor position. The ratio of the sine to cosine then forms the tangent, and the arctangent of the sine/cosine ratio can be used to calculate motor position and derived rate. However this method exhibits periodic errors and can result in motor speed fluctuations when used in a motor control loop, and thus is not useful in systems that need precise control.

What is needed then is a low cost motor controller suitable for fine resolution motor control that is also relatively inexpensive. Such a motor controller is provided by the present invention, whose features and advantages will be more clearly understood from the following detailed description taken in conjunction with accompanying drawings.

BRIEF DESCRIPTION OF THE DRAWINGS

FIG. 1 illustrates a block diagram of a motor system including a portion of a motor controller used for rate derivation according to the present invention.

FIG. 2 illustrates a block diagram of a complementary filter for use with the motor controller of FIG. 1.

DETAILED DESCRIPTION OF THE PREFERRED EMBODIMENTS

Figure 3:
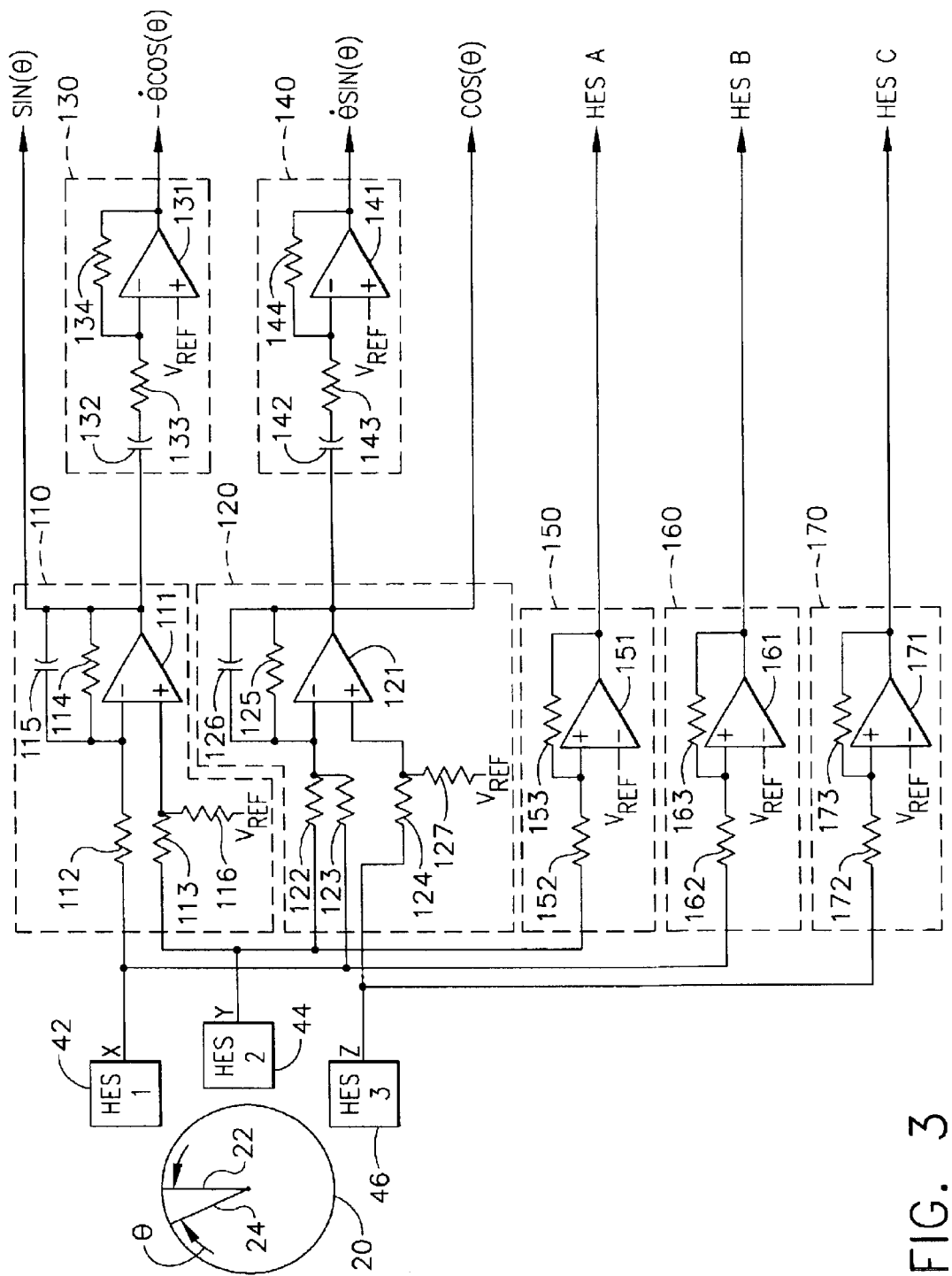
FIG. 3 illustrates a partial block diagram and partial schematic diagram of a circuit implementation of the hardware portion of the motor controller of FIG. 1.

FIG. 1 illustrates a block diagram of a motor system 10 including a portion of a motor controller 30 used for rate derivation according to the present invention. Motor system 10 includes generally a motor 20 and motor controller 30. Motor 20 is a three-phase, four-pole brushless motor having a rotor that has an instantaneous position 24 with respect to a reference point 22 forming an angle labeled "Θ".

Motor controller 30 is used to drive the commutation sequence for motor 20 and, according to the present invention, provides an output proportional to a high resolution motor rate estimate labeled "$\dot{\Theta}$" for use by a servo control loop. Motor controller 30 includes generally a hardware processor 40 and a software processor 70. Hardware processor 40 includes three analog Hall-effect sensors 42, 44, and 46 labeled "HES 1", "HES 2", and "HES 3", respectively. Hall-effect sensors 42, 44, and 46 are illustrated as being adjacent to one another but are actually placed at 120° intervals around the circumference of motor 20. Note that since motor 20 is a four-pole motor, any of Hall-effect sensors 42, 44, and 46 may be placed at positions 180° from these uniformly spaced positions to obtain the desired signal. Furthermore any of the sensors may be placed at positions 90° from these uniformly spaced positions to obtain an inverse of the same signal, which can then be inverted to obtain the desired signal. Sensors 42, 44, and 46 provide three corresponding output signals labeled "X", "Y", and "Z", respectively. A summing device 52 has a positive input terminal coupled to the output of HES 1 for receiving signal X, a negative input terminal coupled to the output of HES 2 for receiving signal Y, and an output terminal. A multiplication block 54 has an input terminal coupled to the output terminal of summing device 52, and an output terminal, and multiplies the input thereof by the value $$\frac{1}{\sqrt{3}}$$

to provide an output on an output signal line 56. A rate block 58 transforms this value by a filter transfer function $$\frac{0.0004s}{0.00004s+1}.$$

System 20 also includes a summing device 62 having a first positive input terminal coupled to the output terminal of HES 2 for receiving signal Y, a second positive input terminal coupled to the output terminal of HES 1 for receiving signal X, a negative input terminal coupled to the output terminal of HES 3 for receiving signal Z, and an output terminal. A multiplication element 64 has an input terminal coupled to the output terminal of summing device 62, and an output terminal, and multiplies the input thereof by the value $$\frac{1}{2}$$

to provide an output on an output signal line 66. A rate block 68 transforms this value by a filter transfer function $$\frac{0.0004s}{0.00004s+1}.$$

In software processor 70 an inverter 72 has an input coupled to signal line 56, and an output, and provides a value at the output thereof equal to the negative of the value at the input. A multiplication element 74 has a first input coupled to the output terminal of filter 58, a second input coupled to signal line 66, and an output. Multiplier 76 has a first input coupled to the output of filter 68, a second input coupled to the output of inverter 72, and an output. Summing device 78 has a first positive input coupled to the output of multiplier 74, a second positive input coupled to the output of multiplier 76, and an output for providing a signal proportional to $\dot{\Theta}$, namely 0.0004 $\dot{\Theta}$.

Analog Hall-effect sensors 42, 44, and 46 form three sinusoidal waveforms (X, Y, and Z, respectively) that can be converted into sine (sin( )) and cosine (cos( )) functions of the instantaneous rotor position $\Theta$. Note that the rotor position is a function of time, $\Theta$ (t), but will be referred to below as $\Theta$ to ease discussion. Summoning device 52 provides an output equal to X−Y=√3 a sin($\Theta$), and multiplication block 54 normalizes this value by multiplying it by $$\frac{1}{\sqrt{3}}$$

to form a value equal to sin($\Theta$) on signal line 56. Similarly summing device 62 provides an output equal to X+Y−Z=2cos($\Theta$), and multiplication block 64 normalizes this value by multiplying it by $$\frac{1}{2}$$

to form a value equal to cos($\Theta$) on signal line 66. The mathematical derivation of these functions are contained in APPENDIX I below.

Rate blocks 58 and 68 have identical transfer functions and are used to form the rotor rate modulated by sine and cosine functions, respectively. The factor 0.0004 in the numerator is used to scale the value to prevent the output from saturating the analog input circuits in the hardware circuit (since the rotor rate can be very high). The (0.00004s+1) term in the denominator is used to filter high-frequency noise. At low frequencies, the output of rate block 58 is equal to $$0.0004\dot{\Theta}\left[\frac{d(\sin(\Theta))}{dt}\right].$$

However since $\Theta$ is actually a function of time, $$\frac{d(\sin(\Theta))}{dt} = \frac{d(\sin(\Theta(t)))}{dt} = \cos(\Theta(t))\frac{d(\Theta(t))}{dt} = \dot{\Theta}\cos(\Theta).$$

Thus the output of rate block 58 is equal to 0.0004 $\dot{\Theta}$ cos($\Theta$). Likewise the output of rate block 68 is equal to −0.0004 $\dot{\Theta}$ sin($\Theta$). These four signals (sine, cosine, and rotor rate modulated by sine and cosine) are multiplied together in multipliers 74 and 76 to form rotor rate modulated by cosine² and sine² functions, respectively. Adder 78 sums these two signals to form an output signal equal to 0.0004 $\dot{\Theta}$(sin²($\Theta$)+cos²($\Theta$)). This expression can be simplified to 0.0004 $\dot{\Theta}$ based on the trigonometric identity:

sin²(x)+cos²⁻(x)=1 and the output signal can then be normalized. The normalized signal $\dot{\Theta}$ provides a high-resolution estimate of rotor rate, which maintains constant amplitude for all angles even when individual Hall-effect sensors exhibit amplitude or phase errors. The instantaneous position can be obtained by taking the arctangent of the ratio of the sin($\Theta$) and cos($\Theta$) terms provided at the outputs of gain blocks 54 and 64, respectively, based on the trigonometric identity $$\tan(x) = \frac{\sin(x)}{\cos(x)}.$$

APPENDIX I, below, provides a rigorous mathematical analysis to show the derivation of rotor rate signal $\dot{\Theta}$ and the effects of amplitude and phase errors.

Note that in an actual embodiment, it is preferable to scale the output of the Hall-effect sensors to provide signals that vary within a range close to the fall voltage range of the components. Thus for example a scaling factor of 2.1 may be used for a five-volt system. The scaling factor is somewhat less than the full range of ±2.5 volts to prevent the analog-to-digital converter from saturating. Thus for example with a 2.1 volt input from the Hall-effect sensors, and a 0.0004 scaling factor by rate blocks 58 and 68, the analog-to-digital converters at the hardware-software interface will see a 1.93-volt input at the maximum motor speed of 2300 radians per second.

A complementary filter of the rotor position $\Theta$ so obtained and the rotor rate $\dot{\Theta}$ can be used to provide broadband motor position and rate and can eliminate the periodic errors and speed fluctuations due to HES errors. FIG. 2 illustrates a block diagram of such a complementary filter 80 for use with motor controller 30 of FIG. 1. Filter 80 includes a summing device 82, a gain adjustment block 84, a summing device 86, and an integrator 88. Summing device 82 has a positive input for receiving the motor rate$\Theta$, a negative input, and an output for providing the difference between the positive and negative inputs thereof. Gain adjustment block 84 has an input coupled to the output of summing device 82, and an output, and provides the output as a product of the input and the value $$\frac{1}{\tau},$$

where τ is the smoothing coefficient of the filter. Summing device 86 has a first input coupled to the output of gain adjustment block 84, a second input for receiving the value $\dot{\Theta}$ calculated as described with respect to FIG. 1, and an output for providing a smoothed estimate of the rotor rate labeled "$\hat{\dot{\Theta}}$". Integrator 88 has an input coupled to the output of summing device 86, and an output for providing a smoothed estimate of the position labeled "$\hat{\Theta}$".

FIG. 3 illustrates a partial block and partial schematic diagram of a circuit implementation 100 of the hardware portion of motor controller 30 of FIG. 1. Elements in common with the system of FIG. 1 are assigned the same reference numbers. Note that circuit 100 is only one of many possible circuits that may be used to implement the system of FIG. 1. Also shown in FIG. 3 are motor 20 and Hall-effect sensors 42, 44, and 46 as in FIG. 1.

Circuit 100 includes generally several operational amplifier (op amp) circuits 110, 120, 130, 140, 150, 160, and 170. Op amp circuit 110 implements summing device 52 and gain block 54. Op amp circuit 110 implements the summing function associated with summing device 52 by receiving signal X on the negative input terminal of an operational amplifier 111 through a resistor 112, and by receiving signal Y on the positive input terminal of operational amplifier 111 through a resistor 113. Op amp circuit 110 includes a feedback resistor 114 and a feedback capacitor 115 each connected between the output and negative input terminals of op amp 111. Op amp circuit 110 also includes a resistor 116 connected between the negative input terminal of op amp 111 and a voltage reference terminal labeled "$V_{REF}$". $V_{REF}$ is an analog ground voltage reference having a value of half the power supply voltage, or in the case of a 5 volt system, about 2.5 volts. Op amp circuit 110 performs the function of gain block 54 by the ratio of the resistance of resistor 114 to that of resistor 112, and the ratio of the resistance of resistor 116 to that of resistor 113. Resistors 114 and 116 have a value of 11.55 kilohms (kΩ), whereas resistors 112 and 113 have a value of 20 kΩ. Thus the gain is equal to 11.55 kΩ/20 kΩ, which is approximately equal to $$\frac{1}{\sqrt{3}}.$$

The output terminal of op amp 111 provides the value sin(Θ).

Circuit 100 includes a second op amp circuit 120 to implement summing device 62 and gain block 64 of FIG. 1. Op amp circuit 120 implements the summing function associated with summing device 62 by receiving signals X and Y on the negative input terminal of an op amp 121 through resistors 122 and 123, respectively, and by receiving signal Z on the positive input terminal of op amp 121 through resistor 124. Circuit 120 includes a feedback resistor 125 and a feedback capacitor 126 each connected between an output terminal and the negative input terminal of op amp 121. Circuit 120 also includes a resistor 127 connected between the negative input terminal of operational amplifier 121 and $V_{REF}$. Op amp circuit 120 performs the function of gain block 64 by the ratio of the resistance of resistor 125 to that of resistors 122 and 123, and the ratio of the resistance of resistor 127 to that of resistor 124. Resistors 125 and 127 each have a value of 10 kΩ, whereas resistors 122–124 each have a value of 20 kΩ. Thus the gain is equal to 10 kΩ/20 kΩ, which equals $$\frac{1}{2}.$$

The output terminal of op amp 121 provides the value cos(Θ).

Op amp circuit 130 includes an op amp 131, a capacitor 132, and resistors 133 and 134. Op amp 131 has a negative input terminal coupled to the output terminal of op amp 111 through the series combination of capacitor 132 and resistor 133, a positive input terminal connected to $V_{REF}$, and an output terminal for providing the value $-\dot{\Theta}\cos(\Theta)$. Resistor 134 is connected between the output terminal and the negative input terminal of op amp 131. Resistor 133 has a value of 4 kΩ and resistor 134 has a value of 40 kΩ. Capacitor 132 has a value of 0.01 micro Farads (μF). The transfer function of op amp circuit 130 is equal to $$\frac{\tau s}{\tau s + 1} = \frac{R_{134} C_{132} s}{R_{133} C_{132} s + 1} = \frac{0.0004 s}{0.00004 s + 1}$$

which is the desired transfer function.

Op amp circuit 140 is structurally identical to op amp circuit 130 and has an op amp 141, a capacitor 142, and resistors 143 and 144 each connected the same as and having the same values as corresponding elements 131–134 in op amp circuit 130. Op amp circuit 140 provides the value $\dot{\Theta}\sin(\Theta)$ at the output terminal thereof.

Op amp circuit 150 includes an op amp 151 having a positive input terminal receiving signal Y through a resistor 152 having a value of 1 kΩ, a negative input terminal connected to $V_{REF}$, and an output terminal for providing sign HES A. A resistor 153 having a value of 100 kΩ is connected between the output and positive input terminals of op amp 151. Op amp circuit 150 provides a high gain on signal Y and essentially "squares it up" to provide signal HES A. Op amp circuit 160 is structurally identical to op amp circuit 150 and includes an op amp 161 and resistors 162 and 163 having the same connections and values as corresponding elements 151–153 in op amp circuit 150. Op amp circuit 160 however receives signal X to provide output signal HES B. Op amp circuit 170 is also structurally identical to op amp circuit 150 and includes an op amp 171 and resistors 172 and 173 having the same connections and values as corresponding elements 151–153 in op amp circuit 150. Op amp circuit 170 however receives signal Z to provide output signal HES C.

Figure 4:
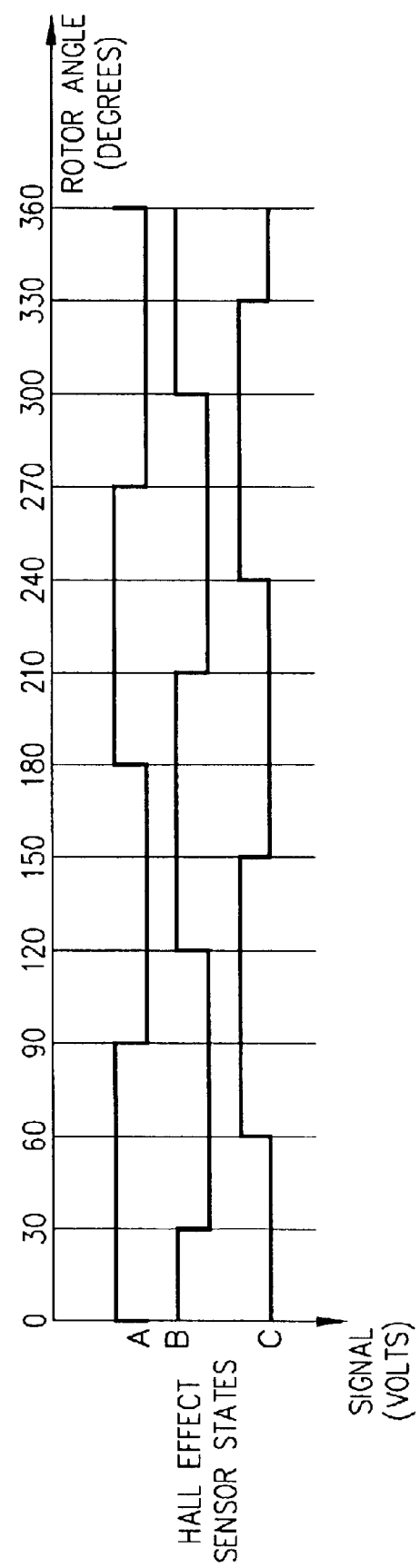
FIG. 4 illustrates a timing diagram of the commutation sequence of the motor controller of FIG. 1.

Signals HES A, HES B, and HES C are useful in controlling the commutation sequence of motor 30 as further illustrated in FIG. 4, which illustrates a timing diagram of the commutation sequence of motor controller 30 of FIG. 1. In FIG. 4 the horizontal axis represents motor angle in degrees, whereas the vertical axis shows the voltage of signals HES A, HES B, and HES C, which can be used to drive the commutation sequence for both clockwise and counter-clockwise rotation. The commutation sequence is a conventional commutation sequence for a four-pole, brushless stator-driven motor that drives an active phase at a voltage of 28 volts.

The hardware/software interface is formed when the values sin(Θ), cos(Θ), $-\dot{\Theta}\cos(\Theta)$, and $\dot{\Theta}\sin(\Theta)$ are provided to respective analog-to-digital converter inputs of a microcontroller (not shown in FIG. 3). The microcontroller performs the further cross multiplications of the terms to arrive at the value for $\dot{\Theta}$ as described with reference to FIG. 1 above. It should be apparent that the split between hardware and software is somewhat arbitrary and may be varied from application to application. For example in another embodiment the outputs of the Hall-effect sensors may be provided directly into analog-to-digital converter inputs and the remainder of the processing would be performed in software. However circuit 100 is an efficient implementation of the functions associated with elements 52, 54, 58, 62, 64, and 68 and may also be conveniently combined into a single integrated circuit.

While the invention has been described in the context of a preferred embodiment, various modifications will be apparent to those skilled in the art. For example while the rotor rate estimation apparatus is useful in autopilot servo systems, other applications are also readily apparent such as automatic power steering control. Furthermore the system can be implemented in hardware, software, or various combinations of the two. Accordingly, it is intended by the appended claims to cover all modifications of the invention that fall within the true scope of the invention.

APPENDIX I

Assuming the sensor inputs X, Y, & Z have unity amplitude and equally spaced phase signals the derived Sine and Cosine amplitudes are as follows.

Sine Amplitude:

$X-Y = \sin(\Theta+30) - \sin(\Theta+150)$ $X-Y = [\sin\Theta\cos(30) + \cos\Theta\sin(30)] - [\sin\Theta\cos(150) + \cos\Theta\sin(150)]$ $X - Y = \left[\frac{\sqrt{3}}{2}\sin\Theta + \frac{1}{2}\cos\Theta\right] - \left[-\frac{\sqrt{3}}{2}\sin\Theta + \frac{1}{2}\cos\Theta\right]$ $X-Y = \sqrt{3}\sin\Theta$ {Equation 1}

Cosine Amplitude:

$X+Y-Z = \sin(\Theta+30) + \sin(\Theta+150) - \sin(\Theta+270)$ $X+Y-Z = [\sin\Theta\cos(30) + \cos\Theta\sin(30)] + [\sin\Theta\cos(150) + \cos\Theta\sin(150)] - [\sin\Theta\cos(270) + \cos\Theta\sin(270)]$ $X + Y - Z = \left[\frac{\sqrt{3}}{2}\sin\Theta + \frac{1}{2}\cos\Theta\right] + \left[-\frac{\sqrt{3}}{2}\sin\Theta + \frac{1}{2}\cos\Theta\right] + \cos\Theta$ $X+Y-Z = 2\cos\Theta$ {Equation 2}

Equations 1 and 2 provide the relative amplitudes for nominal sensor inputs. System 20 of FIG. 1 normalizes the sine and cosine signals by dividing them by $\sqrt{3}$ and 2, respectively.

Manufacturing tolerances in positioning the Hall-effect sensors result in angular errors and proximity errors. To examine the effects of angular position error (phase) and proximity errors (amplitude) the derivation can be expanded to include error terms. The angular position errors of sensor 42 and 44 are represented as $\Delta_X$ and $\Delta_Y$, respectively. The amplitudes of sensors 42 and 44 are represented as $A_X$ and $A_Y$, respectively. Thus the $\sin\Theta$ derivation including sensor amplitude and phase errors is as follows:

$X-Y = A_X\sin(\Theta+30+\Delta_X) - A_Y\sin(\Theta+150+\Delta_Y)$ $X-Y = A_X[\sin\Theta\cos(30+\Delta_X) + \cos\Theta\sin(30+\Delta_X)] - A_Y[\sin\Theta\cos(150+\Delta_Y) + \cos\Theta\sin(150+\Delta_Y)]$ $X-Y = [A_X\cos(30+\Delta_X) - A_Y\cos(150+\Delta_Y)]\sin\Theta + [A_X\sin(30+\Delta_X) - A_Y\sin(150+\Delta_Y)]\cos\Theta$ Represent constants by M, N:

$X-Y = M\sin\Theta + N\cos\Theta$ $X - Y = M\left[\sin\Theta + \frac{N}{M}\cos\Theta\right]$ Assign $\tan t = \frac{N}{M}$ $X-Y = M[\sin\Theta + \tan t\cos\Theta]$ $X - Y = \frac{M}{\cos t}[\sin\Theta\cos t + \sin t\cos\Theta]$ $X - Y = \frac{M}{\cos t}\sin(\Theta + t)$ $X - Y = \frac{[A_X\sin(30+\Delta_X) - A_Y\sin(150+\Delta_Y)]}{\cos t}\sin(\Theta + t)$ {Equation 3}

Where $t = \arctan\left[\frac{[A_X\sin(30+\Delta_X) - A_Y\sin(150+\Delta_Y)]}{[A_X\cos(30+\Delta_X) - A_Y\cos(150+\Delta_Y)]}\right]$ The $\cos\Theta$ derivation including sensor amplitude and phase errors:

$X+Y-Z = A_X\sin(\Theta-30+\Delta_X) + A_Y\sin(\Theta+150+\Delta_Y) - A_Z\sin(\Theta+270+\Delta_Z)$ $X+Y-Z = A_X[\sin\Theta\cos(30+\Delta_X) + \cos\Theta\sin(30+\Delta_X)] + A_Y[\sin\Theta\cos(150+\Delta_Y) + \cos\Theta\sin(150+\Delta_Y)] - A_Z[\sin\Theta\cos(270+\Delta_Z) + \cos\Theta\sin(270+\Delta_Z)]$ $X+Y-Z = [A_X\cos(30+\Delta_X) + A_Y\cos(150+\Delta_Y) - A_Z\cos(270+\Delta_Z)]\sin\Theta + [A_X\sin(30+\Delta_X) + A_Y\sin(150+\Delta_Y) - A_Z\sin(270+\Delta_Z)]\cos\Theta$ Represent constants by M, N $X+Y-Z = M\sin\Theta + N\cos\Theta$ $X + Y - Z = N\left[\frac{M}{N}\sin\Theta + \cos\Theta\right]$ Assign $\tan t = \frac{M}{N}$ $X+Y-Z = N[\tan t\sin\Theta + \cos\Theta]$ {Equation 4}

$X + Y - Z = \frac{N}{\cos t}[\sin\Theta\sin t + \cos\Theta\cos t]$ $X + Y - Z = \frac{N}{\cos t}\cos(\Theta - t)$ $X + Y - Z = \frac{[A_X\sin(30+\Delta_X) + A_Y\sin(150+\Delta_Y) - A_Z\sin(270+\Delta_Z)]}{\cos t}\cos(\Theta - t)$ Where $t = \arctan\left[\frac{[A_X\cos(30+\Delta_X) - A_Y\cos(150+\Delta_Y) - A_Z\cos(270+\Delta_Z)]}{[A_X\cos(30+\Delta_X) - A_Y\cos(150+\Delta_Y) - A_Z\cos(270+\Delta_Z)]}\right]$ The effects of sensor errors on the angle rate can be analyzed from the sine and cosine functions including error effects. Equations 3 & 4 can be represented in the form:

$A_S\sin(\Theta + \Delta_S)$ $A_C\cos(\Theta + \Delta_C)$

Applying derivative function, cross-multiplying and summing the results provides the $\sin^2 + \cos^2$ form.

$$A_S A_C \dot{\Theta} \sin(\Theta + \Delta_S)\sin(\Theta + \Delta_C) + A_S A_C \dot{\Theta} \cos(\Theta + \Delta_S)\cos(\Theta + \Delta_C) \quad \text{[Equation 5]}$$
$$A_S A_C \dot{\Theta} [\sin\Theta\cos\Delta_S + \cos\Theta\sin\Delta_S][\sin\Theta\cos\Delta_C + \cos\Theta\sin\Delta_C] +$$
$$A_S A_C \dot{\Theta} [\cos\Theta\cos\Delta_S - \sin\Theta\sin\Delta_S][\cos\Theta\cos\Delta_C - \sin\Theta\sin\Delta_C]$$
$$A_S A_C \dot{\Theta} \begin{bmatrix} \sin^2\Theta\cos\Delta_S\cos\Delta_C + \sin\Theta\cos\Theta\cos\Delta_S\sin\Delta_C + \sin\Theta\cos\Theta\cos\Delta_C\sin\Delta_S + \cos^2\Theta\sin\Delta_S\sin\Delta_C + \\ \cos^2\Theta\cos\Delta_S\cos\Delta_C - \sin\Theta\cos\Theta\cos\Delta_S\sin\Delta_C - \sin\Theta\cos\Theta\cos\Delta_C\sin\Delta_S + \sin^2\Theta\sin\Delta_S\sin\Delta_C \end{bmatrix}$$
$$A_S A_C \dot{\Theta} [\sin^2\Theta\cos\Delta_S\cos\Delta_C + \cos^2\Theta\sin\Delta_S\sin\Delta_C + \cos^2\Theta\cos\Delta_S\cos\Delta_C + \sin^2\Theta\sin\Delta_S\sin\Delta_C]$$
$$A_S A_C \dot{\Theta} [\sin^2\Theta [\cos\Delta_S\cos\Delta_C + \sin\Delta_S\sin\Delta_C] + \cos^2\Theta [\sin\Delta_S\sin\Delta_C + \cos\Delta_S\cos\Delta_C]]$$
$$A_S A_C \dot{\Theta} [\sin^2\Theta + \cos^2\Theta][\cos\Delta_S\cos\Delta_C + \sin\Delta_S\sin\Delta_C]$$
$$A_S A_C \dot{\Theta} [\cos\Delta_S\cos\Delta_C + \sin\Delta_S\sin\Delta_C]$$

We claim:

1. A method for performing fine resolution motor control comprising the steps of:

forming a first signal proportional to $\sin(\Theta)$ and a second signal proportional to $\cos(\Theta)$ using a plurality of analog Hall-effect sensors, wherein $\Theta$ is an angular position of a rotor of the motor with respect to a predetermined reference point as a function of time;

differentiating said first and second signals to obtain third and fourth signals, respectively;

multiplying said second and third signals to provide a fifth signal;

forming an inverse of a product of said first signal and said fourth signal to provide a sixth signal; and summing said fifth and sixth signals to provide an output signal proportional to a rotor rate in response.

2. The method of claim 1 wherein said step of forming said inverse of said product of said first signal and said fourth signal to provide said sixth signal comprises the steps of:

inverting said first signal to form an inverted first signal; and multiplying said inverted first signal by said fourth signal to obtain said sixth signal.

3. The method of claim 1 wherein said step of forming said first signal proportional to $\sin(\Theta)$ and said second signal proportional to $\cos(\Theta)$ using said plurality of analog Hall-effect sensors comprises the step of placing first, second, and third analog Hall-effect sensors at substantially uniform intervals around the circumference of said motor.

4. The method of claim 3 wherein said step of forming said first signal proportional to $\sin(\Theta)$ further comprises the step of subtracting an output of said second Hall-effect sensor from an output of said first Hall-effect sensor to obtain said first signal.

5. The method of claim 3 wherein said step of forming said second signal proportional to $\cos(\Theta)$ further comprises the step of summing an output of said first Hall-effect sensor, an output of said second Hall-effect sensor, and the negative of an output of said third Hall-effect sensor to obtain said second signal.

6. The method of claim 1 further comprising the step of normalizing said first and second signals prior to said step of differentiating.

7. The method of claim 1 further comprising the step of obtaining an instantaneous position of said rotor by taking the arctangent of the ratio of said first signal to said second signal.

8. A method for performing fine resolution motor control comprising the steps of:

placing first, second, and third analog Hall-effect sensors at substantially uniform intervals around the circumference of a motor, said first, second, and third analog Hall-effect sensors producing respective signals X, Y, and Z;

forming a first signal proportional to $\sin(\Theta)$ and a second signal proportional to $\cos(\Theta)$ in response to said signals X, Y, and Z wherein $\Theta$ is an angular position of a rotor of the motor with respect to a predetermined reference point as a function of time;

differentiating said first signal to obtain a third signal having a value proportional to $\dot{\Theta}$ times $\cos(\Theta)$ wherein $\dot{\Theta}$ is an estimate of a rate of said rotor;

differentiating said second signal to obtain a fourth signal having a value proportional to $-\dot{\Theta}$ times $\cos(\Theta)$;

multiplying said second and third signals to obtain a fifth signal proportional to $\dot{\Theta}$ times $\cos^2(\Theta)$;

multiplying an inverse of said first signal and said fourth signal to obtain a sixth signal proportional to $\dot{\Theta}$ times $\sin^2(\Theta)$; and summing said fifth and sixth signals to obtain an output signal proportional to $\dot{\Theta}$.

9. The method of claim 8 wherein said step of forming said first and second signals comprises the steps of:

subtracting Y from X to form a first difference signal and multiplying said first difference signal by a first predetermined number to form said first signal; and adding X to Y and subtracting Z to form a second difference signal and multiplying said second difference signal by a second predetermined number to form said second signal.

10. The method of claim 9 wherein said first predetermined number is equal to $$\frac{1}{\sqrt{3}}$$

and said second predetermined number is equal to $$\frac{1}{2}.$$

11. The method of claim 8 further comprising performing the steps of placing, deriving, integrating said first signal, and integrating said second signal in hardware circuitry, and performing said steps of multiplying and summing in software.

12. The method of claim 8 further comprising the step of obtaining an instantaneous position of said rotor by taking the arctangent of the ratio of said first signal to said second signal.

13. A motor controller comprising:

first, second, and third Hall-effect sensors positioned at substantially uniform intervals around the circumference of a motor, each of said first, second, and third Hall-effect sensors providing corresponding first, second, and third analog output signals;

a first adder having inputs for receiving said first and second analog output signals, and an output for providing a difference between said first and second analog output signals;

a second adder having inputs for receiving said first, said second, and said third analog output signals and having an output for providing a value equal to the first analog output signal plus the second analog output signal minus said third analog output signal;

a first gain element having an input coupled to said output of said first adder, and an output for providing a first signal proportional to a sine of a position of said rotor;

a second gain element having an input coupled to said output of said second adder, and an output for providing a second signal proportional to a cosine of a position of said rotor;

a first rate block having an input coupled to said output of said first gain element, and an output;

a second rate block having an input coupled to said output of said second gain element, and an output;

a first multiplier having a first input coupled to said output of said first integrator, a second input coupled to said output of said second gain element, and an output;

a second multiplier having a first input coupled to said output of said first gain element through an inverter, a second input coupled to said output of said second integrator, and an output; and a summing device having a first input coupled to said output of said first multiplier, a second input coupled to said output of said second multiplier, and an output for providing an output signal proportional to a rotor rate signal estimate.

14. The motor controller of claim 13 further comprising a smoothing filter having a first input for receiving said rotor rate estimate, a second input for receiving a rotor position signal, and first and second outputs for providing a smoothed rotor position and a smoothed rotor rate estimate, respectively.

15. The motor controller of claim 14 wherein said smoothing filter comprises:

a first summing device having a first input for receiving said rotor position signal, a second input for coupled to said second output of said smoothing filter, and an output for providing a difference between said first and second inputs thereof;

a multiplication clement having a first input coupled to the output of the first summing device, and an output for providing a product of said first input and a predetermined multiplication factor;

a second summing device having a first input for receiving said rotor rate estimate, a second input coupled to said output of said multiplication element, and an output for providing said first output of said smoothing filter as a sum of said first and second inputs thereof; and an integrator having an input coupled to said output of second summing device, and an output for providing said second output of said smoothing filter.

* * * * *